Patented June 11, 1940

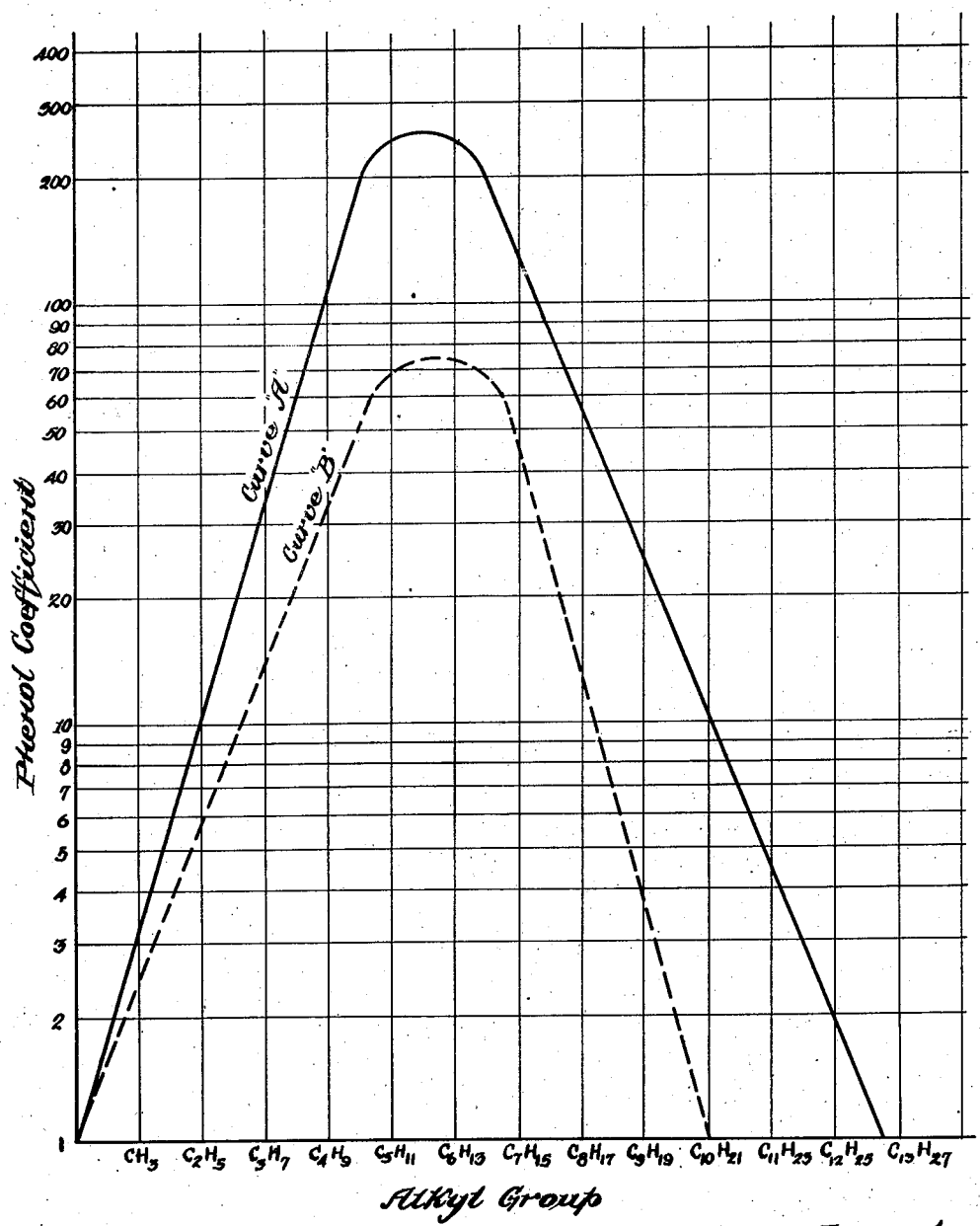

2,204,339

UNITED STATES PATENT OFFICE 2,204,339

ALKYLATED PHENOLS AND A PROCESS OF PRODUCING THEM

Albert Frank Bowles, Philadelphia, Pa., assignor to Reilly-Whiteman-Walton Company, Conshohocken, Pa., a corporation of Pennsylvania Application September 19, 1938, Serial No. 230,572

5 Claims. (Cl. 260—624)

The present invention relates to phenolic compounds having germicidal, fungicidal and disinfectant properties, and to processes of producing the same.

A purpose of the invention is to effect simultaneous condensation and alkylation of phenolic compounds, such as phenol and its homologues, analogues, isomers and derivatives.

A further purpose is to obtain phenolic compounds of unusually high phenol coefficients which are very useful for germicidal, fungicidal and disinfectant purposes.

A further purpose is to condense phenolic molecules and by the same reaction alkylate each of the phenolic molecules going into the ultimate condensation.

A further purpose is to effect simultaneous condensation and alkylation of phenolic compounds by the intervention of a dehydrating catalyst, such as anhydrous aluminum chloride, anhydrous zinc chloride, anhydrous boron trichloride, anhydrous titanium tetrachloride, anhydrous calcium chloride, anhydrous silicon chloride, anhydrous selenium chloride, anhydrous tellurium chloride or a mixture of the same.

A further purpose is to condense molecules of phenolic compounds such as phenol, cresol (ortho, meta or para), xylenol, pseudo-cumenol, carvacrol, thymol, quaiacol, resorcinol, pyrocatechol, quinol, orcinol, phloroglucinol, pyrogallol, hydroxyquinol, naphthol, anthranol, phenanthrol, hydroxyquinoline, flavol, or the di-, tri-, or other polyhydroxy compounds of naphthalene, anthracene, quinoline or phenanthracene, and at the same time alkylate the condensation product by reaction with a saturated aliphatic alcohol of a chain length at least as great as ethyl alcohol, for example ethyl, propyl, butyl, amyl, hexyl, heptyl, octyl, nonyl, decyl, undecyl, myristyl, lauryl, cetyl or stearyl.

A further purpose is to react the components in the proportions of one molecular equivalent of phenolic compound, one to three molecular equivalents of saturated aliphatic alcohol and one to three times as much dehydrating catalyst as the total weight of phenolic compound plus aliphatic alcohol, quickly heating the compounds to a preliminary reaction temperature of 150° C. to 190° C., and, after 2 to 5 hours at this temperature, again increasing the temperature to a final reaction temperature of 200° C. to 260° C., maintaining the final reaction temperature for from 2 to 4 hours.

A further purpose is to obtain a novel ether having germicidal, fungicidal and disinfectant properties, and possessing the general structural formula:

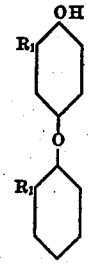

where R represents a saturated alkyl group of a chain length at least as great as ethyl, and the benzene rings are representative of any suitable aromatic compound having the benzene, naphthalene, anthracene and quinoline or other aromatic nucleus. The particular positions of the alkyl groups and the hydroxyl group in the above formula are not intended to be critical.

A further purpose is to produce a desirable ring condensation product having germicidal, fungicidal and disinfectant properties and possessing the general structural formula:

where $R_1$ represents a saturated alkyl group of a chain length at least as great as ethyl. The particular positions of the alkyl and hydroxyl groups are not intended to be critical. The naphthaline ring here is representative of any suitable pleural-ring nucleus such as the anthracene, quinanthracene, quinoline, phenanthrene or other like poly-ring aromatic nucleus which may be formed.

A further purpose is to render a condensation product of the present invention soluble in water by sulphonation.

A further purpose is to produce derivatives of the condensation product of the present invention by introducing one or more of the following elements or their equivalents: mercury, sulphur, bismuth, antimony or arsenic.

Further purposes appear in the specification and in the claims.

The drawing illustrates curves which are useful in explaining the invention.

The alkylation of phenolic bodies has been practiced for some time as shown for example by Dohme United States Patent 1,649,670 and Schoeller United States Patent 1,798,813. In these prior art processes it has often been necessary to go through several reaction steps and to use expensive hydrogenation or reduction. In the prior processes, there have frequently been low yields at various stages.

In accordance with the present invention, the alkylation of phenolic bodies is greatly simplified and cheapened. I successfully carry on the complete operation in a single step. The yields by my novel process are consistently high. Complicated and expensive procedures are rendered entirely unnecessary in my process. Furthermore, I have succeeded in obtaining alkylated phenolic compounds having very unusually high phenol coefficients. These new compounds are obtained with ease by my process.

In accordance with the procedure of the invention, it is merely necessary to react the phenolic compound and the saturated aliphatic alcohol in the presence of a dehydrating catalyst at a suitable temperature, desirably in a reaction vessel equipped with a reflux condenser. The reaction product is very readily separated and purified from the residue and from the dehydrating catalyst by vacuum distillation.

I prefer to employ from one to three molecular equivalents of ethyl or higher saturated aliphatic alcohol to one molecular equivalent of phenolic compound. The ratio of alkyl to aryl compounds should preferably be as 3 to 2. The weight of dehydrating catalyst should preferably be from 1 to 3 times the total weight of the alkyl-aryl reaction components. When less dehydrating catalyst is used than the above ratio, or when a lower ratio of alkyl compound to aryl compound is employed than that recommended, it is possible to obtain results but the yields are correspondingly reduced.

My experimental results indicate that if the recommended procedure be followed, one can rely upon a yield of better than 80% of active germicide.

While it is not intended to limit the invention by the following theoretical discussion, or to represent that the formulae given are necessarily accurate, it is believed that the reaction follows generally the following stages.

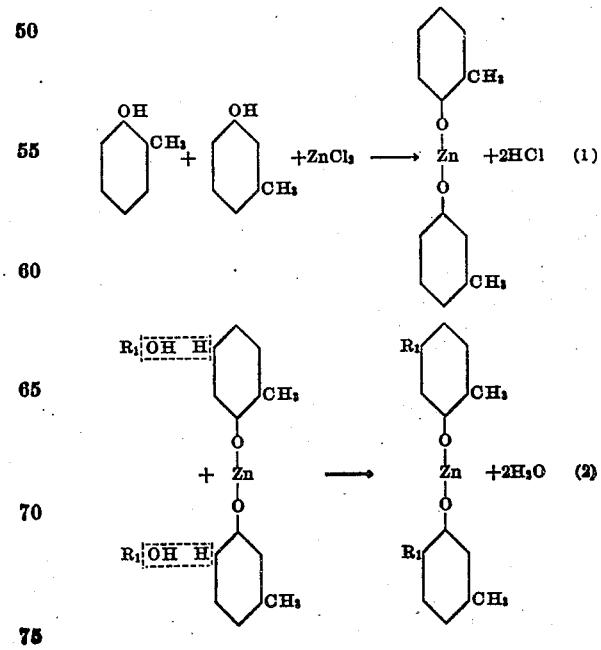

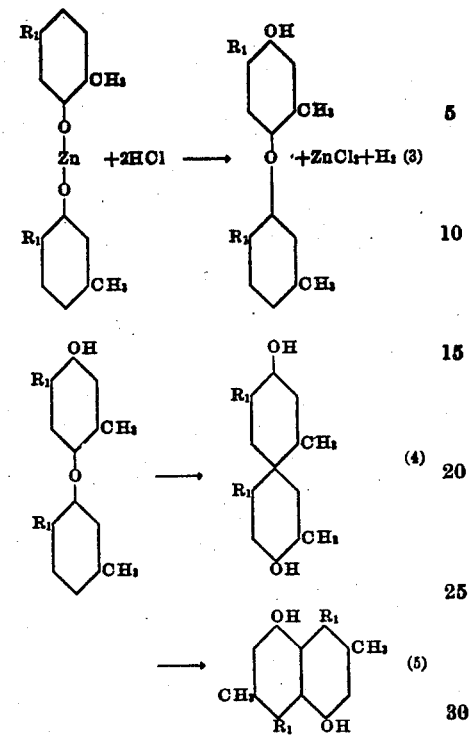

In the above reactions, it is assumed that mixed cresols (commercial cresylic acid) are reacting with a suitable alcohol represented by the general formula $R_1OH$ in the presence of zinc chloride. In Reaction 1, two molecules of the phenolic compound (cresol) react with a molecule of zinc chloride, liberating hydrochloric acid. The zinc soap, under the dehydrating action of zinc chloride, reacts with the alcohol to cause alkylation as indicated in Reaction 2. The zinc soap then appears to break down to produce a phenolic ether as indicated in Reaction 3. This ether is one of the final products and is a valuable germicide, fungicide and disinfectant. To a certain extent the ether undergoes molecular rearrangement as shown in Reaction 4, producing a dihydroxy diphenyl compound.

All of the above reactions appear to take place at the temperature of the preliminary reaction, suitably between 150° C. and 190° C. and in the time of from 2 to 5 hours.

With further heating at more elevated temperature, a ring condensation appears to take place, resulting in a product whose composition is not known with absolute certainty, but which appears to have the formula shown in Reaction 5. This ring condensation takes place between 200° C. and 260° C. after heating from 2 to 4 hours. The ring condensation product is very valuable as a disinfectant, fungicide and germicide.

It will thus be seen that the reaction produces an ether having the general formula

in which R is an aromatic nucleus and $R_1$ is a saturated alkyl group of a chain length at least as great as ethyl.

There is further formed a condensation product of the general type

where $R_0$ is a pleural-ring nucleus and $R_1$ is a saturated alkyl group of a chain length at least as great as ethyl.

The preferred phenolic compound is cresol (ortho, meta or para), either in pure form or as mixed cresols in the commercial product known as cresylic acid. The invention is applicable to phenolic compounds generally, and a large number of different ones may be suggested. In fact, any homologue, analogue, isomer or derivative of phenol which still remains phenolic may be employed. Among the phenolic compounds which can be used with success are phenol, cresol (ortho, meta or para), xylenol, pseudocumenol, carvacrol, thymol, quaiacol, resorcinol, pyrocatechol, quinol, orcinol, phloroglucinol, pyrogallol, hydroxyquinol, naphthol, anthranol, phenanthrol, hydroxyquinoline, flavol, or the di-, tri-, or other poly-hydroxy compounds of naphthalene, anthracene, quinoline or phenanthracene.

The invention is generally applicable to saturated aliphatic alcohols at least as high as ethyl. Methyl alcohol does not serve satisfactorily, as introduction of the methyl group does not substantially increase the phenol value. Study of the curves shown in the drawing will make this clear. The ordinates plotted to logarithmic scale are phenol coefficients and the abscissae plotted to linear scale are the number of carbon atoms in the alcohol. Curve A is for Crysocaine, the product of the type produced in Reaction 5. Curve B is for the ethers of the type produced in Reaction 3. The phenol coefficient rises rapidly beyond methyl alcohol in both types of compounds. Between ethyl and amyl the curves rise abruptly. Between amyl and hexyl the curves flatten off and beyond hexyl the curves drop. In working with alcohols beyond hexyl, it is therefore desirable to increase solubility of the resulting phenolic product by sulphonation. Increased solubility of the higher alcohol condensation products increases the phenol coefficient. Sulphonation of the resultant product is included within the invention.

Beyond hexyl, the phenol coefficient drops off sharply, the phenol coefficient being below 1 beyond lauryl alcohol.

Brief study of the curves will indicate that the most desirable alcohols to employ are amyl and hexyl.

As the molecular weight of the alcohol increases, the toxicity index of the compounds indicated by the curves increase; that is, the number of milligrams per kilogram of body weight of the white rats tested increases.

As the molecular weight of the substituted alkyl group increases, the corrosion index, that is, the destructive influence of the germicidal compound decreases.

The present invention does not comprehend the use of unsaturated alcohols as they result in condensation at the olefinic linkage, producing different compounds. This subject matter is included in my patent application Serial No. 175,248.

Suitable alcohols for alkylation in accordance with the invention are ethyl, propyl, butyl, amyl, hexyl, heptyl, octyl, nonyl, decyl, undecyl, myristyl, lauryl, cetyl, or stearyl.

It will of course be understood that mixtures of alcohols or mixtures of phenolic compounds or mixtures of both may be employed to advantage in particular cases.

The dehydrating catalysts are anhydrous chlorides of metals or metalloids. The following anhydrous compounds may be used satisfactorily as dehydrating catalysts: aluminum chloride, zinc chloride, boron trichloride, titanium tetrachloride, calcium chloride, silicon chloride, selenium chloride and tellurium chloride. Mixtures of these materials will likewise be used. Because of their toxicity, selenium chloride and tellurium chloride are not recommended. The most satisfactory materials are aluminum chloride, zinc chloride and boron trichloride.

In the present product the hydroxy group may be substituted by sulphur or by a metallic group such as mercury, arsenic or the like. Likewise it will be understood that hydrogen or other groups in the final product may be replaced by other groups to produce derivatives.

After extended search it has been found that the alkyl phenolic compounds of the present invention have phenol coefficients which are unusually high and much greater than those of products produced in the prior art.

Using the Federal Food and Drug Administration method with *Staphylococcus aureus* as the test organism, it is found that the phenol coefficients of various existing products are as shown in the table. The Crysocaine referred to in the table is the trade-mark of the product of the present invention produced in accordance with Example 1.

|  | Phenol coefficient |
|---|---|
| Phenol | 1 |
| Cresylic acid, crude | 2 to 5 |
| Cresol U. S. P. | 3 |
| Resorcinol U. S. P. | 1.5 |
| Isopropyl meta cresol (thymol) | 30 |
| Para tertiary amyl phenol | 40 |
| Hexyl resorcinol | 47 |
| Iso butyl meta cresol | 57 |
| Mercuric chloride | 22 |
| Lysol | 2 |
| Isopropyl ortho cresol (Chaoricol) | 23 |
| Crysocaine crude | 170 |
| Crysocaine pure | 230 |

The following examples of the commercial use of the invention are given by way of illustration without intention to limit the scope of the invention. It will of course be understood that the principles herein explained may be applied to other products and that the products of the present invention may be prepared in other ways.

*Example 1*

In a suitable reaction vessel equipped with a reflux condenser and mechanical stirrer, is placed a mixture of 325 pounds of cresylic acid (purity of not less than 80% of ortho, meta and para cresols, determined by the boiling range) and 390 pounds of mixed amyl alcohols (purity not less than 70% of the three primary alcohols and about 30% of the secondary amyl alcohols). To this mixture is added 250 pounds of anhydrous aluminum chloride during the course of two hours while maintaining the temperature at between 30° C. and 70° C., preferably between 40° C. and 50° C.

After the aluminum chloride has been added the mixture is quickly heated to a temperature between 160° C. and 190° C. and preferably between 170° C. and 180° C. Efficient stirring is employed and the reaction mixture maintained at this temperature for 3½ to 5 hours to complete the primary reaction. The temperature is thereafter quickly raised to between 210° C. and 220° C. to complete the rearrangement and ring condensation. After allowing the mixture to cool to about 100° C., 1200 pounds of cold water are introduced and the mixture stirred and allowed to separate. The oily product is then washed with 1200 pounds of 2% sodium carbonate solution and, after separation, a third washing with 1200 pounds of cold water is made. After cooling for several hours the clear brownish oil is drawn off and distilled in vacuo.

The first fraction consists of a small amount of unreacted amyl alcohol. This first fraction comes over below 90° C. at a pressure of 3 to 4 millimeters of mercury.

The second fraction is collected at a temperature of 138° C. to 142° C. under a pressure of 3 to 4 millimeters of mercury. It amounts to between 6% and 10% of the reaction mixture, and is a commercially valuable germicide, fungicide and disinfectant.

The third fraction contains the bulk of the product and distills between 155° C. and 164° C. at a pressure of 3 to 4 millimeters of mercury. This amounts to from 65% to 80% of the reaction mixture, and is the Crysocaine crude of the present invention.

The residue is a tar-like material which boils at a temperature between 190° C. and 220° C. (chiefly above 215° C.) under a pressure of 3 to 4 millimeters of mercury.

The Crysocaine crude obtained in the third fraction has a phenol coefficient of from 90 to 100 against typhosus bacilli and from 170 to 190 against Staphylococcus aureus using the Federal Food and Drug Administration method. Substantially the same phenol coefficients are obtained for the second and fourth fractions as for the third fraction.

The second, third, and fourth fractions are as explained quite similar in phenol coefficients, and are believed to represent products of progressive alkylation, the second fraction being perhaps the mono-aryl product of the general type of the formula of Reaction 5, and the third fraction being the di-aryl product, while the fourth fraction may be the poly-aryl product. If desired, the second, third and fourth fractions may be mixed to produce a technical grade product.

*Example 2*

Into a suitable reactor equipped with an efficient reflux condenser and a mechanical stirrer is placed a mixture of 325 pounds of 80 to 90% tricresol and 390 pounds of amyl alcohol. To this mixture 700 pounds of fused anhydrous zinc chloride are added and the mixture while thoroughly stirred is quickly heated to a primary reaction temperature of between 160° C. and 190° C. for the period of 3½ to 5 hours. The temperature is then raised to between 200° C. and 230° C. for 2 hours to complete the double condensation, alkylation and rearrangement.

After allowing the reaction mixture to cool for several hours it is washed three times with 1200 pound quantities of cold water. The yellowish oily liquid is then drawn off and distilled in vacuo.

The first fraction consists of a small amount of unreacted amyl alcohol.

The second fraction which distills between 138° C. and 142° C. under 3 to 4 millimeters of mercury pressure amounts to 4 to 7% of the reaction mixture.

The principal fraction, boiling between 155° C. and 164° C. at 3 to 4 millimeters of mercury pressure, amounts to 80 to 90% of the reaction product. This is the crude Crysocaine of the present invention.

The fourth fraction boils between 190° C. and 220° C. under a pressure of 3 to 4 millimeters of mercury.

The phenol coefficient of the principal fraction obtained in this example when tested by the Federal Food and Drug Administration method is from 90 to 120 against typhosus bacilli and from 200 to 230 against Staphylococcus aureus. The phenol coefficients of the second and fourth fractions are substantially the same as that for the principal fraction.

*Example 3*

Into a reactor as above, a mixture of 325 pounds of 95 to 98% pure distilled cresol (ortho, meta and para) and 390 pounds of primary normal amyl alcohol is placed. To the mixture is added 700 pounds of pulverized fused anhydrous zinc chloride. The mixture is quickly heated to 180° C. to 190° C., while being vigorously stirred, and then maintained at this temperature for 5 hours. The temperature is thereafter quickly raised to 200° C. to 220° C. for 2 hours to complete the double condensation and alkylation. The reaction mass after being allowed to cool is washed three times with 1200 pound quantities of cold water. The oily product is separated from the final wash water and distilled in vacuo.

The first fraction consists of unreacted amyl alcohol, coming over below 90° C. at a pressure of 3 to 4 millimeters of mercury.

The second fraction distills at 138° C. to 142° C. under a pressure of 3 to 4 millimeters of mercury, and amounts to about 5 to 8% of the reaction mixture.

A third fraction distills at 158° C. to 164° C. at a pressure of 3 to 4 millimeters of mercury and amounts to 85 to 92% of the reaction mixture. This is the Crysocaine pure referred to above.

A fourth fraction distills at 194° C. to 205° C. under a pressure of 3 to 4 millimeters of mercury, and amounts to 3 to 4% of the reaction mixture. It solidifies on standing and may be crystallized.

The pure Crysocaine obtained in the third fraction has a phenol coefficient of 220 to 240 against Staphylococcus aureus by the Federal Food and Drug Administration method. It is comparatively non-corrosive to healthy tissue as measured by the effect on a day old chicken heart. It has a toxicity of from 0.75 to 1.37 grams per kilogram body weight as determined on white mice.

The second and fourth fractions are closely similar to the third fraction in phenol coefficients, non-corrosiveness and toxicity.

In general the product of the invention can be relied upon to have a phenol coefficient in excess of 90 by the Federal Food and Drug Administration method, depending upon the type of microorganism used, and the phenol coefficients run as high as 240. For typhosus bacilli the phenol coefficients of the products of the invention range between 90 and 110, and for Staphylococcus aureus they range between 170 and 240.

It will be at once apparent that there is considerable advantage in the present invention in employing a $C_2$ to $C_{10}$, both inclusive, saturated aliphatic alcohol, as this avoids the necessity of sulphonating to get a high phenol coefficient. The best results will of course be obtained with the $C_5$ to $C_6$, both inclusive, saturated aliphatic alcohols.

Particularly where alkyl groups higher than hexyl are employed in the condensation product, and the phenol coefficient is correspondingly decreased because of decrease in solubility, but also in the case of the lower alkyl groups, I in many instances find it desirable to sulphonate the condensation products as discussed above. Sulphonation is particularly advantageous from the standpoint of increasing solubility, but may also be employed for other purposes. I find it especially advantageous in certain cases to sulphonate the second fraction or the third fraction of Examples 1, 2 and 3, or a mixture of these fractions.

Example 4

In a suitable vessel place 1000 parts by weight of the reaction product obtained by mixing the second and third fractions of Example 1 (boiling between 138° C. and 164° C. under a pressure of 3 to 4 millimeters of mercury). The product is stirred and in the course of 2 hours there are added 1200 parts by weight of sulphuric acid containing approximately 2% of excess $SO_3$. The mixture is stirred until a sample is completely soluble in water.

To the reaction mixture, an equal volume of ice and water is added and the theoretical quantity of calcium hydroxide is introduced to neutralize the acidic groups, with about 1% excess. The mixture is then filtered. The precipitate is next treated with sodium carbonate solution in sufficient quantity to liberate the condensation product and the sodium salt of the sulphonic acid, soluble in water, is removed from the insoluble calcium carbonate by filtration. The sodium salt is then drum or spray dried, and is ready for commercial use. As an alternative included within the invention the sodium salt is converted into the free sulphonic acid by treatment with hydrochloric acid, then filtered from the sodium chloride and spray or drum dried.

The sulphonic acid and its sodium salt form strongly foaming aqueous solutions of low surface tension and are capable of reducing the interfacial tension of aqueous solutions. They are exceptionally fast wetting and penetrating agents, and have wide application in the textile, leather, paper, ink, plaster and cement industries and numerous other industrial fields.

In some instances it is desirable to form mercury, sulphur, bismuth, antimony, arsenic or other similar derivatives of the condensation products of the present invention. This includes also of course the formation of derivatives including two or more metallic or similar ingredients, such as thio-mercury and thio-arsenic derivatives. These metallic derivatives may be formed of the condensation products of any of the saturated alcohols of chain length at least as great as ethyl with any of the large number of phenolic compounds referred to above.

Example 5

In a suitable vessel place 240.2 parts by weight of the second fraction of the reaction product obtained in Example 1, 2 or 3 (boiling at 138° C. to 142° C. under a pressure of 3 to 4 millimeters of mercury), dissolved in 600 parts by weight of 96% ethyl alcohol. While stirring the mixture, a solution of 324.53 parts by weight of mercuric acetate dissolved in 1000 parts by weight of 96% ethyl alcohol is added during the course of one hour. The stirring is continued for 2 hours more and then the mixture is allowed to stand preferably overnight. The mixture is further stirred and refluxed for one hour after it begins to boil.

The alcohol is removed by distillation, taking the reaction mixture down to about 40% of its original volume. The precipitated mercury derivative is removed by filtration and redissolved in glacial acetic acid and then again precipitated by adding a saturated sodium chloride solution. The product is then filtered by suction and washed three times with cold water to remove the sodium chloride. The material is then dried under suction and finally dried in a vacuum oven at 60° C. to 65° C. under a pressure of 6 to 8 millimeters of mercury for 4 hours.

The mercury derivative of the condensation product is a white crystalline powder, melting at about 189° C., having a phenol coefficient by the Federal Food and Drug Administration method of 1470 against typhosus bacilli and of 2340 against *Staphylococcus aureus*. It has substantially zero corrosiveness and a toxicity (MLD) of 0.1 milligram per kilogram of body weight of white mice.

Example 6

The procedure of Example 5 is repeated using the third fraction of Example 1, 2 or 3 (boiling at 155° C. to 164° C. under a pressure of 3 to 4 millimeters of mercury) instead of the second fraction.

The product obtained consists of white needle-like crystals which melt with decomposition above 200° C.

The phenol coefficients using the Federal Food and Drug Administration method are 1900 against typhosus bacilli, 3100 against *Staphylococcus aureus* and 2780 against Spore B (subtilis).

The corrosiveness is zero and the toxicity (MLD) is 0.1 milligram per kilogram of body weight on white mice.

Example 7

The sulphonyl chloride compound of the second fraction of Exhibits 1, 2 or 3 (boiling at 138° C. to 142° C. at a pressure of 3 to 4 millimeters of mercury) is formed. In a suitable reactor 300 parts by weight of this sulphonyl chloride is treated with 60 parts by weight of mono-sodium-sulphide. The mixture is heated with good stirring to complete the reaction, requiring from 3½ to 4 hours. The solid crystalline mass obtained is dissolved in boiling water and filtered hot under suction. Upon cooling the crystalline thio-derivative of the condensation product separates as an almost colorless crystalline mass which is removed by filtration and dried.

Example 8

The crystalline thio-derivative obtained in Example 7 is dissolved in 600 parts by weight of 96% ethyl alcohol and, during stirring, a cold solution of 275 parts by weight of hydroxy-mercuro-chloride dissolved in 1000 parts of 96% ethyl alcohol is added. The mixture is stirred for 2½ hours and is then allowed to stand over night. The product is refluxed with efficient stirring for 3 hours from the time it boils. To the reaction mixture 50 parts by weight of decolorizing carbon is then added and the mixture filtered under suction. The alcohol is removed by distillation under reduced pressure and the solid residue is dissolved in boiling water and allowed to crystallize on cooling. The crystalline mass is then filtered on a Buchner filter and washed with cold water. The white transparent crystalline compound is converted into the sodium salt and dried under reduced pressure, at 60° C. to 65° C. under a pressure of 8 to 10 millimeters of mercury for 4 to 6 hours.

The resultant product is a relatively nontoxic, noncorrosive, powerful germicidal and fungicidal agent.

Example 9

Following the procedure as outlined in the last example, but using arsenic chloride in 96% ethyl alcohol instead of hydroxy-mercuro-chloride, and employing the same proportions, the thio-arsenic derivative is obtained instead of the thio-mercury derivative. The thio-arsenic derivative is relatively nontoxic and noncorrosive, but has very powerful germicidal and fungicidal properties.

It will be understood that various other metallic and similar derivatives may be obtained using the condensation products of the present invention, without departing from the principles outlined herein.

By the procedure of the present invention it is possible to obtain a very efficient germicide, fungicide and disinfectant in a cheap and easy manner. Complicated reaction steps and uneconomical yields are avoided.

It will be understood of course that other phenolic materials may be substituted in place of cresol and that other saturated aliphatic alcohols may be employed instead of amyl alcohol in the above examples. Likewise, other dehydrating catalysts instead of aluminum chloride, and zinc chloride may be employed.

In view of my invention and disclosure variations and modifications to meet individual whim or particular need will doubtless become evident to others skilled in the art, to obtain all or part of the benefits of my invention without copying the process and composition shown, and I, therefore, claim all such in so far as they fall within the reasonable spirit and scope of my invention.

Having thus described my invention, what I claim as new and desire to secure by Letters Patent is:

1. The process of producing a synthetic material having germicidal, fungicidal and disinfectant properties, which comprises reacting one mole of a phenolic compound with from one to three moles of a saturated aliphatic alcohol of chain length at least as great as ethyl alcohol in the presence of from one to three times as much of a dehydrating catalyst as the total weight of phenolic compound plus alcohol at an initial reaction temperature of from 150° C. to 190° C. for from 2 to 5 hours and continuing the reaction at a final reaction temperature of from 200° C. to 260° C. for from 2 to 4 hours.

2. The process of producing a condensation product having germicidal, fungicidal and disinfectant properties, which comprises reacting one mole of a mixture of ortho-, meta- and para-cresols with from one to three moles of amyl alcohol in the presence of from one to three times as much of a dehydrating catalyst as the total weight of cresols plus alcohol at an initial reaction temperature of from 150° C. to 190° C. for from 2 to 5 hours and continuing the reaction at a final reaction temperature of from 200° C. and 260° C. for from 2 to 4 hours.

3. The process of producing a synthetic material having germicidal, fungicidal and disinfectant properties, which comprises simultaneously condensing and alkylating a phenolic compound by treatment with a saturated aliphatic alcohol of chain length at least as great as ethyl alcohol, in the presence of a dehydrating catalyst and removing by vacuum distillation a fraction having germicidal, fungicidal and disinfectant properties which boils at a temperature between 138° C. and 142° C. under a pressure of between 3 and 4 millimeters of mercury.

4. The process of producing a synthetic material having germicidal, fungicidal and disinfectant properties, which comprises simultaneously condensing and alkylating a phenolic compound by treatment with a saturated aliphatic alcohol of chain length at least as great as ethyl alcohol in the presence of a dehydrating catalyst and removing by vacuum distillation a fraction having germicidal, fungicidal and disinfectant properties which boils at a temperature between 155° C. and 164° C. under a pressure between 3 and 4 millimeters of mercury.

5. A crude synthetic product resulting from double condensation and alkylation of a phenolic compound and a saturated aliphatic alcohol of chain length at least as great as ethyl alcohol in the presence of a dehydrating catalyst, having a toxicity of from 0.75 to 1.37 grams per kilogram of body weight on white mice, relatively non-corrosive to healthy tissue, having a phenol coefficient by the Federal Food and Drug Administration method of from 90 to 240 depending upon the particular microorganism used in the tests and including fractions having specific boiling ranges at a pressure of 3 to 4 millimeters of mercury of between 138° C. and 142° C., between 155° C. and 164° C. and between 190° C. and 220° C.

ALBERT FRANK BOWLES.